(12) United States Patent
Kawakami et al.

(10) Patent No.: US 12,425,201 B2
(45) Date of Patent: Sep. 23, 2025

(54) QUANTUM KEY DELIVERY SYSTEM, QUANTUM KEY DELIVERY METHOD, AND STORAGE MEDIUM

(71) Applicant: NEC Corporation, Tokyo (JP)

(72) Inventors: Tetsuo Kawakami, Tokyo (JP); Wakako Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 18/383,723

(22) Filed: Oct. 25, 2023

(65) Prior Publication Data

US 2025/0141671 A1    May 1, 2025

(30) Foreign Application Priority Data

Nov. 7, 2022  (JP) ................ 2022-178041

(51) Int. Cl.
  *H04L 9/08*  (2006.01)
(52) U.S. Cl.
  CPC .......... *H04L 9/0858* (2013.01); *H04L 9/0819* (2013.01); *H04L 9/0869* (2013.01)
(58) Field of Classification Search
  CPC .... H04L 9/0858; H04L 9/0819; H04L 9/0869
  USPC .................................................. 380/256
  See application file for complete search history.

(56) References Cited

U.S. PATENT DOCUMENTS

| 2006/0263096 A1 | 11/2006 | Dinu et al. |
| 2020/0162248 A1 | 5/2020 | Qi et al. |
| 2022/0141008 A1* | 5/2022 | Lim ............... H04L 9/0855 380/278 |

FOREIGN PATENT DOCUMENTS

| JP | 2019-522394 A | 8/2019 |
| WO | 2017/194582 A1 | 11/2017 |

OTHER PUBLICATIONS

Extended European Search Report for EP Application No. 23206994.8, dated on Mar. 27, 2024.
Neda Cvijetic et al., "Polarization-Multiplexed Optical Wireless Transmission With Coherent Detection", Journal of Lightwave Technology, IEEE, USA, vol. 28, No. 8, Apr. 15, 2010, pp. 1218-1227, XP011304085, ISSN: 0733-8724.

* cited by examiner

*Primary Examiner* — Michael S McNally
(74) *Attorney, Agent, or Firm* — Sughrue Mion, PLLC

(57) ABSTRACT

A quantum key delivery system in which a first transmission device phase modulates a first polarization component of two orthogonal polarization components in transmitted light and modulates a second polarization component, which is the other polarization component, into a signal indicating the second random number sequence, based on a first random number sequence indicating the bit sequence to be transmitted and the second random number sequence indicating the base in the phase modulation of the bit sequence to be transmitted; and a second transmission device separates orthogonal polarization modes in the received light and extracts a clock timing from the signal indicating the second random number sequence.

4 Claims, 7 Drawing Sheets

QUANTUM KEY DELIVERY SYSTEM, QUANTUM KEY DELIVERY METHOD, AND STORAGE MEDIUM

This application is based upon and claims the benefit of priority from Japanese patent application No. 2022-178041, filed on Nov. 7, 2022, the disclosure of which is incorporated herein in its entirety by reference.

TECHNICAL FIELD

The present disclosure relates to a quantum key delivery system, a quantum key delivery method, and a storage medium.

BACKGROUND ART

One type of quantum key distribution (QKD) is a continuous-variable quantum key distribution (CV-QKD) (see, for example, PCT (WO) 2019-522394).

In continuous-variable quantum key delivery, it is necessary to synchronize the clock timing between the transmitter and receiver of quantum light. Since the intensity of the quantum light is very weak, a clock extraction signal with a strong intensity different from that of the quantum light is necessary to precisely match the clock timing between the transmission side and reception side. It is desirable to be able to communicate this signal for clock extraction efficiently.

SUMMARY

An example of an object of the present disclosure is to provide a quantum key delivery system, a quantum key delivery method, and a storage medium that can solve the above-mentioned problem.

According to the first example aspect of the present disclosure, the quantum key delivery system is provided with: a first communication device and a second communication device communicatively connected by a first channel and a second channel that is more reliable than the first channel, the first communication device comprising: a dual-polarization quadrature phase-shift keying (DP-QPSK) modulator that phase modulates a first polarization component of two orthogonal polarization components in transmitted light and modulates a second polarization component, which is the other polarization component, into a signal indicating a second random number sequence based on a first random number sequence indicating the bit sequence to be transmitted and the second random number sequence indicating the base in the phase modulation of the bit sequence to be transmitted; an optical intensity attenuator that attenuates an optical intensity of the modulated first polarization component; and a polarizing beam splitter that polarization multiplexes the first polarization component with the attenuated optical intensity and the modulated second polarization component and outputs the resulting signal light to the first channel, and the second communication device comprising: a polarizing beam splitter that separates orthogonal polarization modes in the transmitted signal light to perform reading of the second random number sequence encoded in a component orthogonal to the weak light and extraction of the clock timing for the reception of the weak light; a local light source for coherent detection; a 90° hybrid that interferes with the weak light component among the polarization-separated components and the local light to read the orthogonal phase component; a photodetector that converts the read orthogonal phase component into an electrical signal; a signal processing means that generates a quantum raw key by reading the first random number sequence from the electrical signal based on the clock timing extracted by the polarizing beam splitter; a base reconciliation means that generates a selection key by performing a base reconciliation process using communication on the second channel between the first and second communication devices based on the generated quantum raw key and the second random number sequence; an error correction means that performs error correction on the generated selection key, using communication on the second channel between the first and second communication devices; and a confidentiality enhancement means that generates a quantum key by enhancing the confidentiality of the selection key after error correction using communication in the second channel between the first and second communication devices.

According to the second example aspect of the present disclosure, the quantum key delivery method includes the steps of: a first communication device of a quantum key delivery system comprising the first communication device and a second communication device communicatively connected by a first channel and a second channel that is more reliable than the first channel phase modulating a first polarization component of two orthogonal polarization components in transmitted light and modulating a second polarization component, which is the other polarization component, into a signal indicating the second random number sequence, based on a first random number sequence indicating the bit sequence to be transmitted and the second random number sequence indicating the base in the phase modulation of the bit sequence to be transmitted; attenuating an optical intensity of the modulated first polarization component; and polarization multiplexing the first polarization component with the attenuated optical intensity and the modulated second polarization component, and outputting the resulting signal light to the first channel, and the second communication device separating orthogonal polarization modes in the transmitted signal light to perform reading of the second random number sequence encoded in a component orthogonal to the weak light and extraction of the clock timing for the reception of the weak light; outputting local light for coherent detection; interfering with the weak light component among the polarization-separated components and the local light to read the orthogonal phase component; converting the read orthogonal phase component into an electrical signal; generating a quantum raw key by reading the first random number sequence from the electrical signal based on the extracted clock timing; generating a selection key by performing a base reconciliation process using communication on the second channel between the first and second communication devices based on the generated quantum raw key and the second random number sequence; performing error correction on the generated selection key, using communication on the second channel between the first and second communication devices; and generating a quantum key by enhancing the confidentiality of the selection key after error correction using communication in the second channel between the first and second communication devices.

According to the third example aspect of the present disclosure, the non-transitory storage medium stores a program for causing a computer that controls a first communication device of a quantum key delivery system comprising the first communication device and a second communication device communicatively connected by a first channel and a second channel that is more reliable than the first channel to phase modulate a first polarization component of two orthogonal polarization components in transmitted light and modulate a second polarization component, which is the other polarization component, into a signal indicating the second random number sequence, based on a first random number sequence indicating the bit sequence to be transmitted and the second random number sequence indicating the base in the phase modulation of the bit sequence to be transmitted; to attenuate an optical intensity of the modulated first polarization component; and polarization multiplex the first polarization component with the attenuated optical intensity and the modulated second polarization component, and output the resulting signal light to the first channel, and for causing a computer that controls the second communication device to separate orthogonal polarization modes in the transmitted signal light to perform reading of the second random number sequence encoded in a component orthogonal to the weak light and extraction of the clock timing for the reception of the weak light; to output local light for coherent detection; to interfere with the weak light component among the polarization-separated components and the local light to read the orthogonal phase component; to convert the read orthogonal phase component into an electrical signal; to generate a quantum raw key by reading the first random number sequence from the electrical signal based on the extracted clock timing; to generate a selection key by performing a base reconciliation process using communication on the second channel between the first and second communication devices based on the generated quantum raw key and the second random number sequence; to perform error correction on the generated selection key, using communication on the second channel between the first and second communication devices; and to generate a quantum key by enhancing the confidentiality of the selection key after error correction using communication in the second channel between the first and second communication devices.

According to the present disclosure, the communication of signals for clock extraction to synchronize the clock timing between the transmission side and reception side of quantum light in continuous-variable quantum key delivery can be performed relatively efficiently.

EXAMPLE EMBODIMENT

The following is a description of the example embodiments of the present disclosure, but the following example embodiments shall not limit the claimed disclosure. Not all of the combinations of features described in the example embodiments are essential to the solution of the disclosure.

Figure 1:
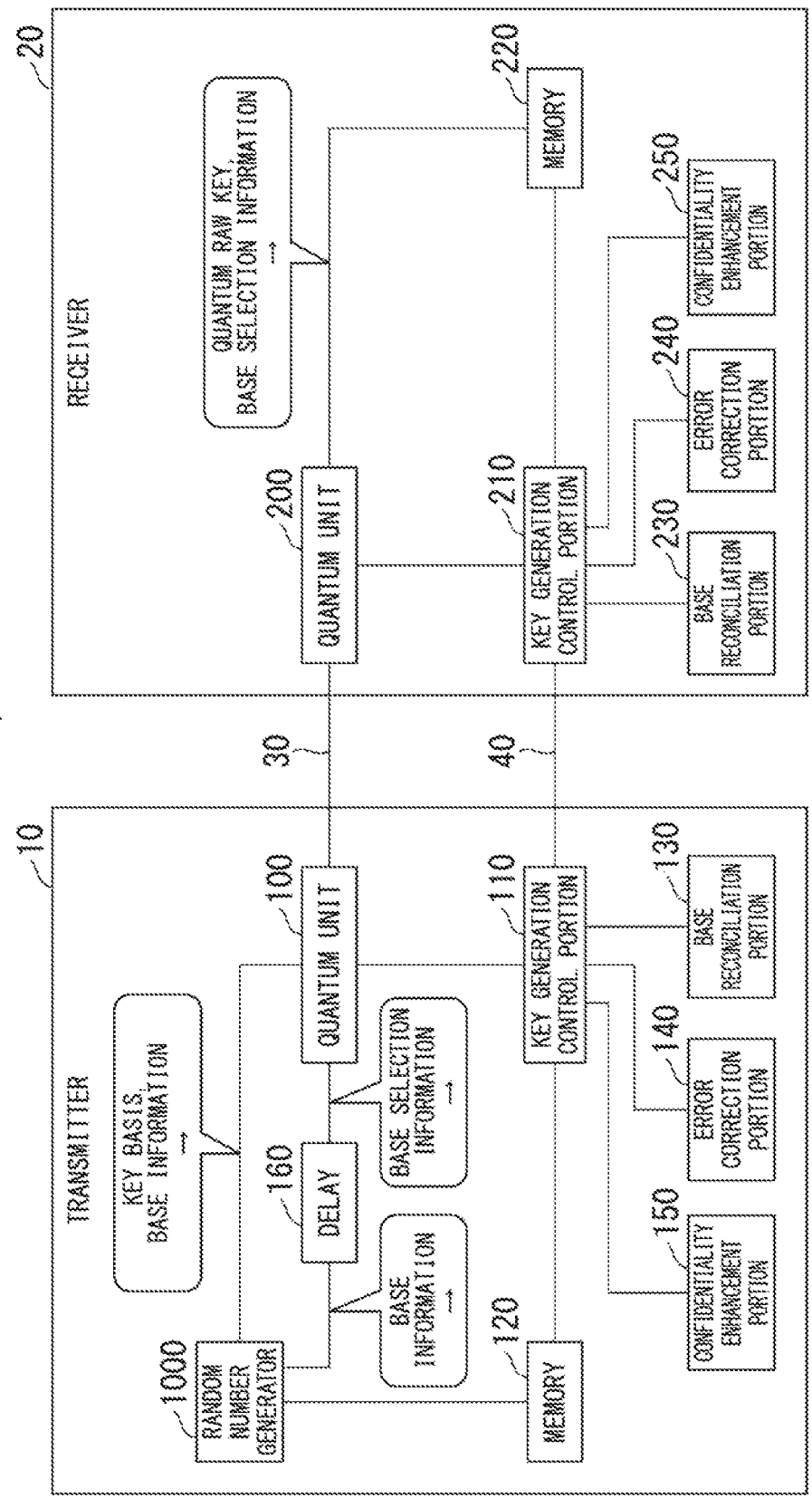
FIG. 1 is a block diagram showing the constitution of the quantum key delivery system.

FIG. 1 is a block diagram showing the constitution of the quantum key delivery system. In FIG. 1, a quantum key delivery system 1 is provided with a transmitter 10 and a receiver 20. The transmitter 10 is provided with a quantum unit 100, a key generation control portion 110, a memory 120, a base reconciliation portion 130, an error correction portion 140, a confidentiality enhancement portion 150, a delay 160, and a random number generator 1000. The receiver 20 is provided with a quantum unit 200, a key generation control portion 210, a memory 220, a base reconciliation portion 230, an error correction portion 240, and a confidentiality enhancement portion 250.

The transmitter 10 and receiver 20 are communicatively connected by a quantum channel 30 and a classical channel 40. Here, the quantum channel is a communication channel for transmitting and receiving weak light transmitted from the transmitter 10 to the receiver 20. Weak light here is, for example, light that behaves in a quantum manner with a light power of about 1 photon/bit (photon/bit) or less. The quantum channel 30 is composed of, for example, an optical fiber. The quantum channel 30 is an example of the first channel.

Note that the notation "transmitting" for the transmitter 10 and "receiving" for the receiver 20 are for convenience of explanation, and data may be transmitted from the receiver 20 to the transmitter 10. In particular, the receiver 20 uses the classical channel 40 to transmit information to the transmitter 10 for processing in quantum key delivery.

The transmitter 10 is an example of a first communication device. The receiver 20 is an example of a second communication device.

The classical channel 40 is a more reliable channel than the quantum channel 30. High reliability of a communication channel means, for example, a low bit error rate (BER).

For the sake of explanation, the following assumes an error-free communication channel as the classical channel 40. Error free here may mean that all communication errors can be corrected by error correction, or that all errors can be detected and retransmitted by error detection. The communication method in the classical channel 40 is not limited to any particular method. The classical channel 40 is an example of a second channel.

The quantum key delivery system 1 performs quantum key delivery. In quantum key delivery, a sequence of random numbers, which are the basis of a cryptographic key, is transmitted using quantum light. This enables secure key sharing between the transmitter 10 and the receiver 20. The quantum key delivery system 1 performs quantum key delivery using light whose intensity is reduced to the point where its quantum behavior can be confirmed. This enables a quantum mechanical guarantee that the encryption key will not be compromised, thus achieving a high degree of confidentiality.

Figure 2:
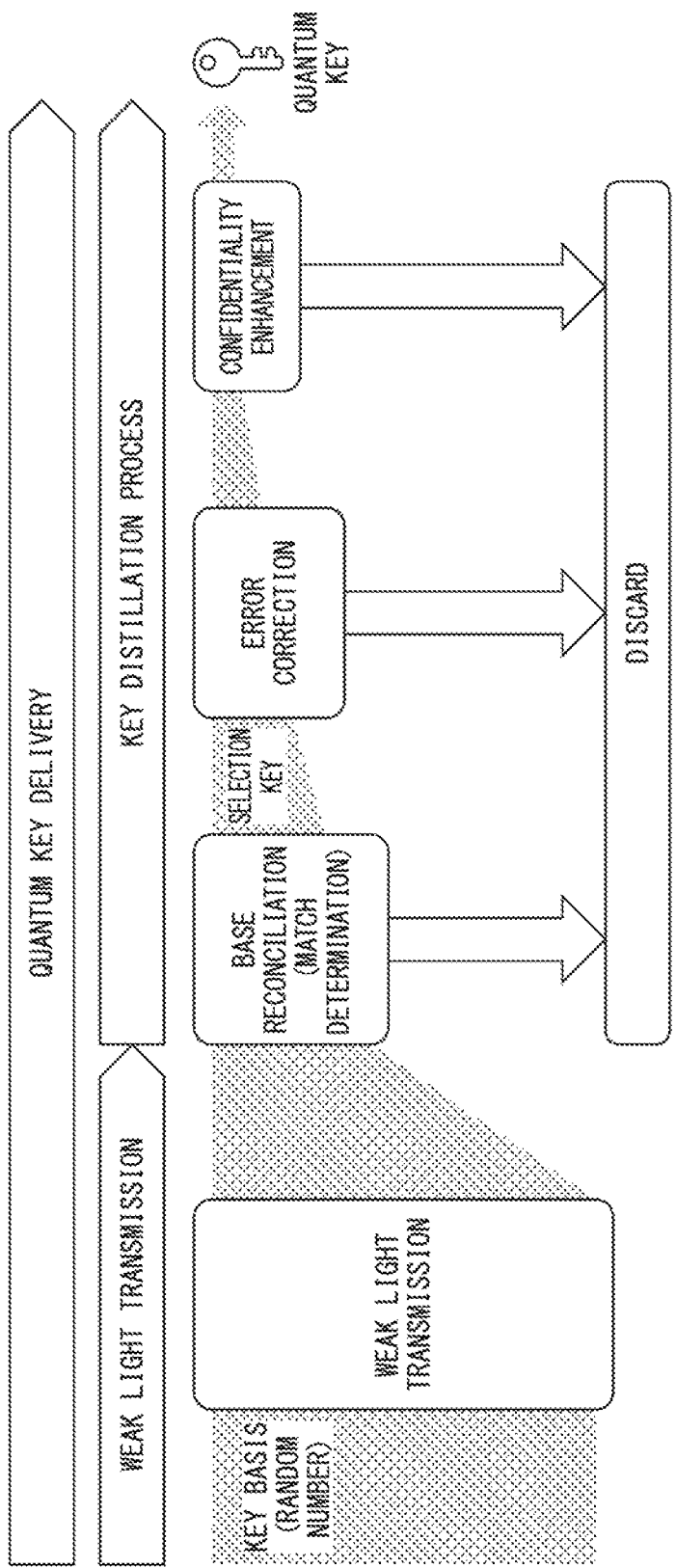
FIG. 2 is a diagram showing an example of the processing procedure in which the quantum key delivery system 1 of the example embodiment performs quantum key delivery.

FIG. 2 shows an example of the process procedure by which the quantum key delivery system 1 performs quantum key delivery.

FIG. 2 shows four processing steps in which the quantum key delivery system 1 performs quantum key delivery: (1) weak optical transmission (photon transmission), (2) base reconciliation, (3) error correction, and (4) confidentiality enhancement.

In (1) weak optical transmission, the transmitter 10 transmits a random number sequence of bit values (binary values), which are the basis of the quantum key, in optical communication in the quantum channel 30 using the DP- QPSK (Dual Polarization Quadrature Phase Shift Keying) modulation method. In that case, the transmitter 10 randomly selects one of the two bases for each elementary bit of the quantum key, and modulates the signal light using the selected base to represent the bit value that is the basis of the quantum key.

The base here is the combination of two of the states used to represent the data in the modulation. Basis selection is the selection of any of a plurality of bases as the base used for modulation. As described below, the quantum key delivery system 1 uses the combination of 0° phase and 180° phase in phase modulation as one base, and the combination of 90° phase and 270° phase as another base.

The quantum key delivery system 1 delivers quantum keys by continuous-variable quantum key delivery. In continuous-variable quantum key delivery, the receiver measures the state of the optical field by coherent detection to generate the cryptographic key. In coherent detection, the signal light is interfered with local light to spatially, temporally, and spectrally filter and read the signal state. As the local light here, a laser beam from a laser source equipped with a receiver is used. This local light is also referred to as local luminescence. Continuous-variable quantity quantum key delivery is also denoted as continuous-variable QKD.

Here, there are two types of quantum key delivery schemes: continuous-variable QKD and discrete-variable QKD (discrete-variable quantum key delivery). In discrete-variable QKD, the receiver uses a photon detector to generate an encryption key from the presence or absence of photons. Continuous-variable QKD can be realized with common optical components and is less expensive than discrete-variable QKD that uses photon detectors. In continuous-variable QKD, filtering using local light can achieve QKD where general communication light and transmission paths coexist.

In coherent detection, by interfering the signal light with a strong local light in terms of optical power, the signal light can gain optical amplification effects. Therefore, even if the power of the signal light is faint, that is, equal to or less than 1 photon/bit, it can be detected using a common photodetector.

In (2) base reconciliation, the receiver 20 reads the information encoded (coded) in the weak quantum light transmitted through the transmission path, synchronizing the clock timing between the transmitter 10 and the receiver 20. To encode information into light or signals here is to modulate the light or signal so that it shows that information.

The receiver 20 reads, from the optical signal from the transmitter 10, the base selection information at the transmitter 10, which is encoded by the transmitter 10 through polarization multiplexing in the quantum light, and stores it in the memory 220. The receiver 20 then projects the detection result onto the I-axis or Q-axis and converts it to a bit value of 0 or 1 based on the stored base selection information. The receiver 20 then obtains the bit value that is the basis of the quantum key from the detection result. When obtaining bit values from the detection results, the receiver 20 sets a certain threshold value for the detection value and discards the bit as a posteriori selection for bits whose absolute value is smaller than the threshold value, because the probability of making a mistake in judging whether the bit is bit 0 or bit 1 is large. Here, discarding a bit means that the bit is not used in the quantum key.

The intensity of the quantum light transmitted in (1) weak optical transmission is very weak, and a clock extraction signal with a strong intensity different from the quantum light is necessary to precisely match the clock timing at the sender and receiver in (2) base reconciliation.

Once the above (2) base reconciliation is completed, the quantum key delivery system 1 performs (3) error correction and (4) confidentiality enhancement. In (3) error correction, the transmitter 10 and the receiver 20 share the same bit sequence between the transmitter and receiver by disclosing a portion of the bits for which base reconciliation has been completed on the classical channel 40 to measure the error rate, and then disclosing a further portion of the bits for correction according to the measured error rate. In (4) confidentiality enhancement, the receiver 20 measures the noise and loss in the quantum channel 30 to estimate the maximum amount of information that can be obtained by an eavesdropper, assuming one is present, and randomly discards part of the bit string so that the amount of information obtained by the eavesdropper is zero. This allows the transmitter 10 and the receiver 20 to share a random number sequence that is quantum mechanically guaranteed not to be tapped.

The random number generator 1000 in the transmitter 10 generates two random number sequences, both in bit strings. One of these two random number sequences is used as the bit sequence forming the basis of the quantum key. This random number sequence is also referred to as the first random number sequence or the first bit sequence. A bit sequence obtained by selecting some of the bits in the first random number sequence is used as the quantum key.

The other of the two random number sequences indicates the base that should be selected for transmitting each bit in the first random number sequence. This random number sequence is also referred to as the second random number sequence or second bit sequence. The second random number sequence can be said to be information that indicates the base used to encode the bit sequence that is the basis of the quantum key. Therefore, the second random number sequence is also referred to as the basis information. The second random number sequence can be said to be information that indicates the base selected by the transmitter 10 when encoding the bit sequence that is the quantum key basis. This is why the second random number sequence is also referred to as the base selection information, or base selection information in the transmitter 10.

The quantum unit 100 handles the transmission side in the aforementioned (1) weak light transmission. The quantum unit 100 modulates the weak light using the random number sequence (first random number sequence) that is the key basis generated by the random number generator 1000 and the random number sequence that is the base selection information (second random number sequence), and transmits the modulated weak light to the receiver 20. The quantum unit 100 modulates and transmits the weak light to the receiver 20 according to the control by the key generation control portion 110.

In the modulation of the weak light, the quantum unit 100 polarization-multiplexes the base selection information as a signal for clock extraction into the quantum light. In doing so, the quantum unit 100 polarization multiplexes the base information (second random number sequence) output by the random number generator 1000, which is time-delayed by the delay 160, as the base selection information.

The purpose of delaying the base information is to prevent eavesdropping. A time delay is provided by the delay 160 to ensure that the receiver 20 receives the base selection information for decoding the code later than the timing of receiving the code with quantum light.

When the receiver used by the eavesdropper receives the quantum light from the transmitter 10, it cannot receive the base selection information for decoding the code by quantum light before receiving the code. The quantum no-cloning theorem states that it is impossible to retain quantum light in its quantum light state without leaving traces, and the eavesdropper's receiver will randomly select one of the two bases to decode the code with the snatched quantum light. In this case, the receiver used by the eavesdropper has a one-in-two chance of decoding using a different base than that used by the transmitter 10, making accurate decoding impossible. It is also impossible to eavesdrop because the quantum state is changed by measurement of a different base, and eavesdropping can be detected.

The key generation control portion 110 controls various parts of the transmitter 10 and performs various processes. In particular, the key generation control portion 110 controls the base reconciliation portion 130, the error correction portion 140, and the confidentiality enhancement portion 150 in addition to the quantum unit 100 described above. The key generation control portion 110 can be implemented by software on a program-controlled processor, such as a central processing unit (CPU), for example.

The memory 120 stores various data. For example, the memory 120 stores the random numbers generated by the random number generator 1000. The random numbers are accessed by the key generation control portion 110 in the process of generating the quantum key. The memory 120 can be implemented using the storage device provided by the transmitter 10.

The base reconciliation portion 130 performs the processing related to (2) base reconciliation above. The base reconciliation portion 130 is an example of a base reconciliation means. The random number sequence obtained in the process performed by the base reconciliation portion 130 is also referred to as the selection key.

The error correction portion 140 performs processing related to (3) error correction above. The error correction portion 140 is an example of an error correction means.

The confidentiality enhancement portion 150 performs the processing related to (4) confidentiality enhancement above. The confidentiality enhancement portion 150 is an example of a confidentiality enhancement means. The random number sequence output by the confidentiality enhancement portion 150 is used as a quantum key.

The functions of the base reconciliation portion 130, the error correction portion 140, and the confidentiality enhancement portion 150, or some thereof, may be implemented by a CPU or graphics processing unit (GPU) executing software. Alternatively, the base reconciliation portion 130, the error correction portion 140, and the confidentiality enhancement portion 150, or some thereof, may be implemented using a field programmable gate array (FPGA) or application specific integrated circuit (ASIC).

The receiver 20 is provided with a quantum unit 200, a key generation control portion 210, a memory 220, a base reconciliation portion 230, an error correction portion 240, and a confidentiality enhancement portion 250.

The quantum unit 200 of the receiver 20 performs the processing of the receiving side in the aforementioned (1) weak light transmission. The quantum unit 200 is controlled by the key generation control portion 210.

The key generation control portion 210 controls various parts of the receiver 20 to perform various processes. In particular, the key generation control portion 210 controls the base reconciliation portion 230, the error correction portion 240, and the confidentiality enhancement portion 250, in addition to the quantum unit 200 described above. The key generation control portion 210 can be implemented by software on a program-controlled processor, such as a CPU, for example.

The memory 220 stores various data. For example, the memory 220 stores the quantized raw key output from quantum unit 200. This quantized raw key is accessed by the key generation control portion 210 in the process of generating the quantum key. The memory 220 can be implemented using a storage device provided by the receiver 20.

The base reconciliation portion 130 and the base reconciliation portion 230 perform processing related to the aforementioned (2) base reconciliation. The base reconciliation portion 130 and the base reconciliation portion 230 are examples of base reconciliation means. The random number sequences output by the base reconciliation portion 130 and the base reconciliation portion 230 are examples of selection keys.

The error correction portion 240 performs processing related to the aforementioned (3) error correction. The error correction portion 240 is an example of an error correction means. The error correction portion 240 ideally performs the same process as the error correction portion 140 and outputs the same random number sequence as the error correction portion 140.

The confidentiality enhancement portion 250 performs processing related to the aforementioned (4) confidentiality enhancement. The confidentiality enhancement portion 250 is an example of a confidentiality enhancement means. The confidentiality enhancement portion 250 ideally performs the same process as the confidentiality enhancement portion 150 and outputs the same random number sequence as the confidentiality enhancement portion 150. The random number sequence output by the confidentiality enhancement portion 250 is used as a quantum key.

The functions of the base reconciliation portion 230, the error correction portion 240, and the confidentiality enhancement portion 250, or some thereof, may be implemented by a CPU or GPU executing software. Alternatively, the base reconciliation portion 230, the error correction portion 240, and the confidentiality enhancement portion 250, or some thereof, may be implemented using hardware such as FPGAs or ASICs.

The key generation control portion 110 of the transmission side and the key generation control portion 210 of the reception side are communicatively connected by the classical channel 40. The classical channel 40 is used by the transmitter 10 and the receiver 20 to exchange information necessary to perform the processing of the base reconciliation portions 130 and 230 and the processing of the error correction portions 140 and 240.

Figure 3:
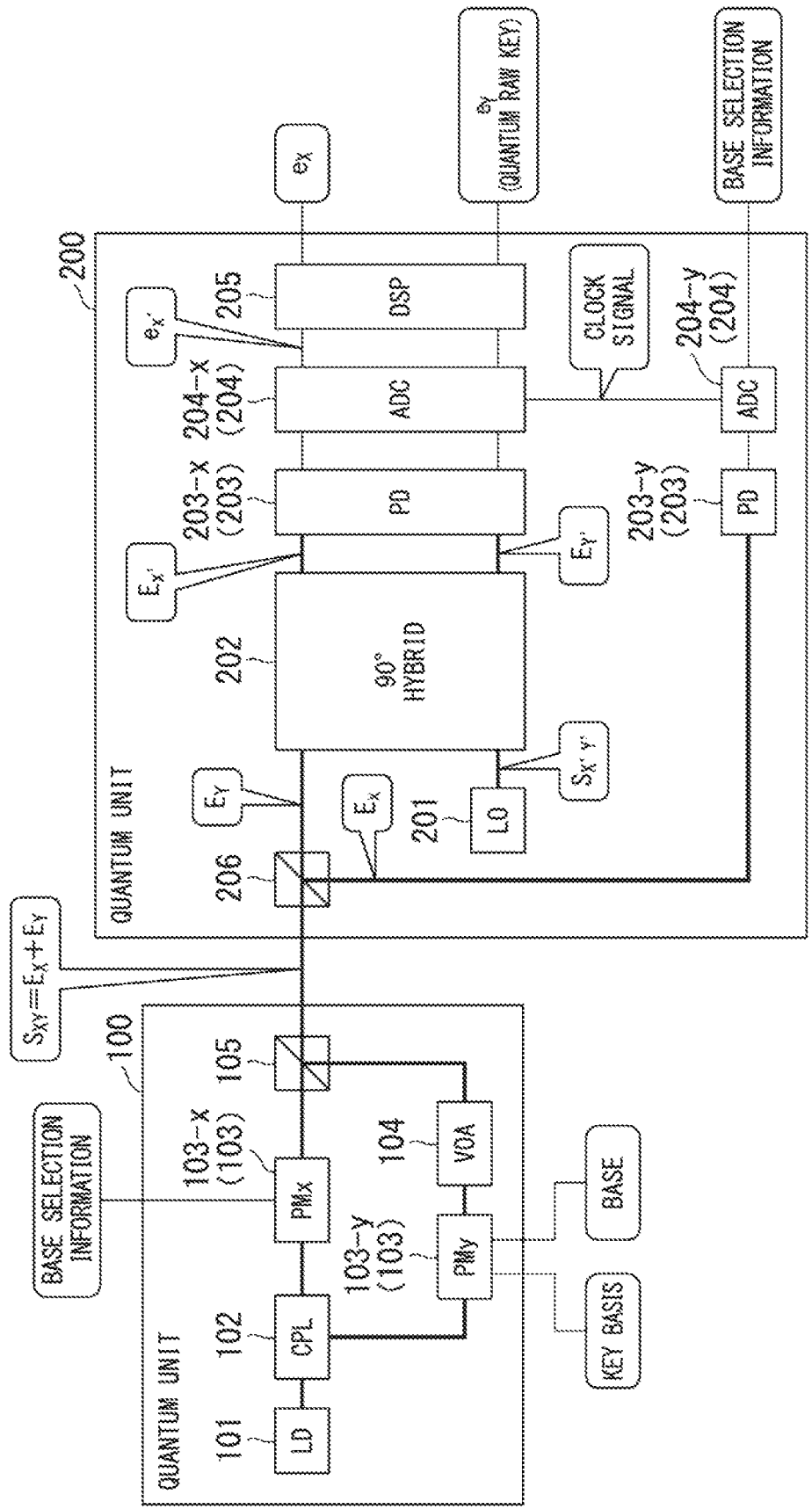
FIG. 3 is a block diagram showing the constitution of the quantum unit 100 and quantum unit 200 according to the example embodiment.

FIG. 3 is a block diagram showing the structure of the quantum unit 100 and the quantum unit 200.

The quantum unit 100 of the transmitter 10 is provided with a light source 101, a coupler 102, a phase modulator 103-$x$, a phase modulator 103-$y$, a variable optical attenuator 104, and polarizing beam splitter 105.

The phase modulators 103-$x$ and 103-$y$ are also collectively referred to as phase modulators 103. The light source is also referred to as LD. The coupler is also referred to as CPL. The phase modulator is also denoted as PM. When distinguishing between the two phase modulators, the phase modulator 103-$x$ is also denoted as PMx while the phase modulator 103-$y$ is also denoted as PMy. The variable optical attenuator is also referred to as a VOA. The polarizing beam splitter is also referred to as a PBS.

As described above for the transmitter 10, the phase modulator 103 modulates the signal light of optical communication in the quantum channel 30 using the DP-QPSK modulation scheme. The phase modulator 103 is an example of a DP-QPSK modulator.

The quantum unit 200 of the receiver 20 is provided with a local light source 201, a 90° hybrid 202, a photodetector 203-x, a photodetector 203-y, an analog-to-digital converter 204-x, an analog-to-digital converter 204-y, a digital signal processing circuit 205, and a polarizing beam splitter 206.

The photodetectors 203-x and 203-y are also collectively referred to as photodetectors 203. The analog-to-digital converters 204-x and 204-y are also collectively referred to as analog-to-digital converters 204. The local light source is also denoted as LO. The photodetectors are also referred to as PDs. The analog-to-digital converters are also referred to as ADCs. The digital signal processing circuit is also referred to as a DSP.

In the quantum unit 100 of the transmitter 10, the light source 101 outputs elementary light that is converted into signal light. The coupler 102 splits the light output by the light source 101 into X-polarized light and Y-polarized light.

The phase modulator 103-x modulates the X polarized light bifurcated by the coupler 102 to generate X polarized signal light Ex. The phase modulator 103-x modulates the X-polarized light on the basis of base information delayed by the delay 160 to produce the X-polarized signal light Ex representing the delayed base information. The delayed base information can be referred to as past base information. As described above, the base information corresponds to the base selection information indicating the base selected by the transmitter 10. The receiver 20 uses the X polarized signal light from the polarization-separated signal light for the clock timing extraction process and the basis matching process.

The phase modulator 103-y modulates the Y polarized light bifurcated by the coupler 102 to generate a Y polarized signal light Ey. The phase modulator 103-y modulates the Y-polarized light on the basis of a first random number sequence, which is a random number sequence representing the bit sequence that is the "key basis," and a second random number sequence representing the "base".

Both the phase modulators 103-x and 103-y modulate light in the DP-QPSK modulation scheme. The combination of the phase modulators 103-x and 103-y corresponds to an example of a DP-QPSK modulator.

Both the first and second random number sequences can be represented by a bit sequence, and the bits in the first random number sequence correspond one-to-one to the bits in the second random number sequence. The phase modulator 103-y selects the base indicated by the bits in the second random number sequence based on the corresponding bits in the first and second random number sequences. The phase modulator 103-y then modulates the Y-polarized light so that the bit value, which is the basis of the key indicated by the bit in the first random number sequence, is represented by the chosen base.

Figure 4:
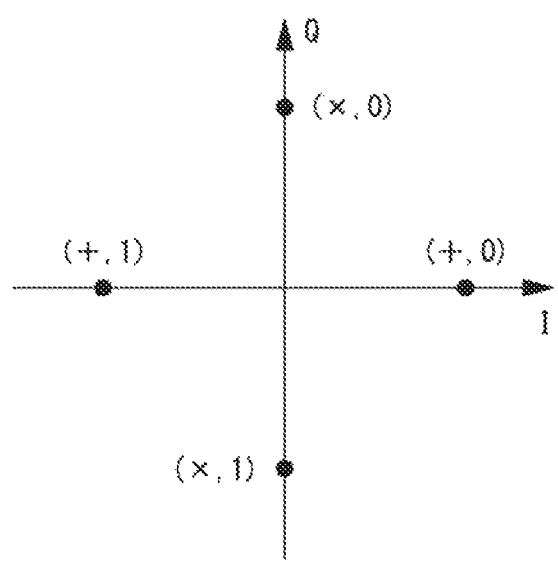
FIG. 4 is an I-Q planar view to illustrate the phase when the phase modulator according to the example embodiment modulates light.

FIG. 4 is an I-Q plan view to illustrate the phase of the phase modulator 103-y modulating the light. In FIG. 4, the phase is represented with respect to the positive direction of the I axis. The phase in the positive direction of the I axis is 0°, the phase in the positive direction of the Q axis is 90°, the phase in the negative direction of the I axis is 180°, and the phase in the negative direction of the Q axis is 270°. In the example in FIG. 4, the combination of the base represented by the bits in the second random number sequence and the bit value represented by the bits in the first random number sequence, which is the basis of the key, is represented as (base, key basis).

When the base is a + (plus) base, phase modulator 103-y modulates using the I axis. Specifically, the phase modulator 103-y performs a 0° phase modulation when (base, key basis)=(+, 0) and a 180° phase modulation when (base, key basis)=(+, 1).

When the base is an x (cross) base, phase modulator 103-y modulates using the Q axis. Specifically, the phase modulator 103-y performs a 90° phase modulation when (base, key basis)=(x, 0) and a 270° phase modulation when (base, key basis)=(x, 1).

The variable optical attenuator 104 attenuates the optical power to a weak state for the Y-polarized signal light Ey, which behaves quantum-like at about 1 photon/bit or less. This makes it possible to determine the presence or absence of eavesdropping based on the principles of quantum mechanics. The variable optical attenuator 104 is an example of an optical intensity attenuator.

The polarizing beam splitter 105 polarization multiplexes the X-polarized signal light Ex and the Y-polarized signal light Ey to generate the signal light Sxy=Ex+Ey. The transmitter 10 transmits the signal light Sxy obtained by polarization multiplexing to the receiver 20.

In the quantum unit 200 of the receiver 20, the polarizing beam splitter 206 separates the signal light Sxy received by the receiver 20 into X-polarized signal light and Y-polarized signal light.

The photodetector 203-y detects and converts the X-polarized signal light obtained by polarization separation of the signal light Sxy into an electrical signal. In the following, this electrical signal is referred to as an electrical signal by X polarization. The detection of signal light by a photodetector is also referred to as detection.

The analog-to-digital converter 204-y reads the base selection information that is encoded in the electrical signal by X polarization and stores the read base selection information in the memory 220. The base selection information stored by the memory 220 is used by the base reconciliation portion 230 when it performs the processing related to the aforementioned (2) base reconciliation.

The analog-to-digital converter 204-y extracts the clock timing of the base selection information in addition to reading the base selection information. The signal indicating the clock timing extracted by the analog-to-digital converter 204-y is used as a trigger in the processing performed by the analog-to-digital converter 204-x.

The signal input to the analog-to-digital converter 204-x is quantum light having an intensity that is very small, making clock timing extraction difficult. Therefore, the quantum key delivery system 1 uses the clock timing of the base selection information as a trigger. This allows the quantum key delivery system 1 to obtain clock timing with high accuracy.

The 90° hybrid 202 interferes the y-polarized signal light obtained by polarization separation of the signal light Sxy with the local light Sx'y'. As a result, the Y-polarized signal light is projected onto arbitrary polarization planes X' and Y' of the local light, and the signal light E_x' projected onto the polarization plane X' and the signal light E_y' projected onto the polarization plane Y' are input to the photodetector 203-x.

The photodetector 203-x detects and converts the signal light Ex' and the signal light Ey' into electrical signals, respectively. The electrical signals obtained by this conversion are also referred to as the electrical signal by signal light Ex' and the electrical signal by signal light Ey'.

The analog-to-digital converter 204-x quantizes (analog-to-digital converts) the electrical signal by signal light Ex' and the electrical signal by signal light Ey', respectively. The signal obtained by quantizing the electrical signal by signal light Ex' is also referred to as the digital electrical signal ex'. The signal obtained by quantizing the electrical signal by signal light Ey' is also referred to as the digital electrical signal ey'.

The digital signal processing circuit 205 performs polarization separation processing for the digital electrical signal ex' and the digital electrical signal ey'. The polarization separation process performed by the digital signal processing circuit 205 corresponds to a coordinate transformation that converts the coordinate system based on the polarization planes Ex' and Ey' into a coordinate system based on the polarization planes in X-polarization and in Y-polarization. Known methods can be used as the method by which the digital signal processing circuit 205 performs polarization separation processing. The digital signal processing circuit 205 generates a digital signal ex corresponding to the signal light Ex and a digital signal ey corresponding to the signal light Ey by the polarization separation processing. The digital signal processing circuit 205 stores the bit sequence indicated by the digital signal ey in the memory 220. This bit sequence is used as a quantized raw key, which becomes a quantum key through (2) basis reconciliation, (3) error correction, and (4) confidentiality enhancement as described above. The (2) base reconciliation, (3) error correction, and (4) confidentiality enhancement are also referred to as the key distillation process.

The digital signal processing circuit 205 is an example of a signal processing means.

According to the quantum key delivery system 1, the wavelength utilization efficiency and signal quality of the continuous quantum QKD can be improved by encoding the base selection information as a signal for clock extraction in the continuous quantum QKD through polarization multiplexing.

As described above, the quantum key delivery system 1 is equipped with the transmitter 10 and the receiver 20, which are communicatively connected by the quantum channel 30 and the classical channel 40, which is more reliable than the quantum channel 30.

The phase modulator 103 of the transmitter 10 phase modulates the first polarization component of the two orthogonal polarization components in the transmitted light based on a first random number sequence indicating the bit sequence to be transmitted and a second random number sequence indicating the base in the phase modulation of the bit sequence to be transmitted. The phase modulator 103 modulates the other polarization component, the second polarization component, into a signal representing the second random number sequence. The variable optical attenuator 104 attenuates the optical intensity of the modulated first polarization component.

The polarizing beam splitter 105 polarization multiplexes the first polarization component with attenuated light intensity and the modulated second polarization component, and outputs the resulting signal light to the quantum channel 30.

The polarizing beam splitter 206 in the receiver 20 polarizes and separates the signal light transmitted from the transmitter 10 through the quantum channel 30 to read out the second random number sequence encoded in components orthogonal to the weak light and to extract the clock timing for weak light reception.

The local light source 201 outputs light for coherent detection.

The 90° hybrid interferes with the weak light component of the polarization-separated components and the local light to read out the orthogonal phase component.

The photodetector 203 converts the readout orthogonal phase component into an electrical signal.

The digital signal processing circuit 205 reads the first random number sequence from the electrical signal and generates a quantum raw key based on the clock timing extracted by the polarizing beam splitter 206.

The base reconciliation portion 230, based on the generated quantum raw key and the second random number sequence, generates a selection key by performing base reconciliation processing using communication on the second channel between the transmitter 10 and the receiver 20.

The error correction portion 240 performs error correction using communication in the second channel between the transmitter 10 and the receiver 20 for the generated selection key.

The confidentiality enhancement portion 250 generates a quantum key by performing confidentiality enhancement on the error-corrected selection key using communication in the second channel between the transmitter 10 and the receiver 20.

Thus, the transmitter 10 polarization-multiplexes the base selection information onto the quantum light, and the receiver 20 uses this base selection information as a signal for clock extraction. According to the quantum key delivery system 1, in this respect, the communication of signals for clock extraction to synchronize the clock timing between the transmission side and reception side of quantum light in continuous-variable quantum key delivery can be performed relatively efficiently. The quantum key delivery system 1 also improves the signal quality in that the receiver 20 can obtain a signal for clock extraction with a stronger intensity than the quantum light.

In addition, in the quantum key delivery system 1, the quantum light and the base selection information used as the signal for clock extraction are polarization multiplexed and transmitted simultaneously, which reduces the effect of wavelength dispersion on the transmission path and thus improves the signal quality in this respect as well.

The delay 160 of the transmitter 10 delays the signal light indicating the second random number sequence. The phase modulator 103 modulates the delayed signal light with DP-QPSK.

According to the quantum key delivery system 1, eavesdropping can be prevented and the storage capacity for storing the random number sequence of coherently detected quantum light can be relatively small.

Specifically, the receiver used by the eavesdropper cannot receive the base selection information for decoding the code prior to receiving the code from quantum light. This prevents eavesdropping, as described above.

The transmitter 10 can also start transmitting the base selection information before the quantum light transmission is completed. This means that the receiver 20 does not need to store the entire random number sequence of coherently detected quantum light, and in this respect, the storage capacity can be relatively small.

Figure 5:
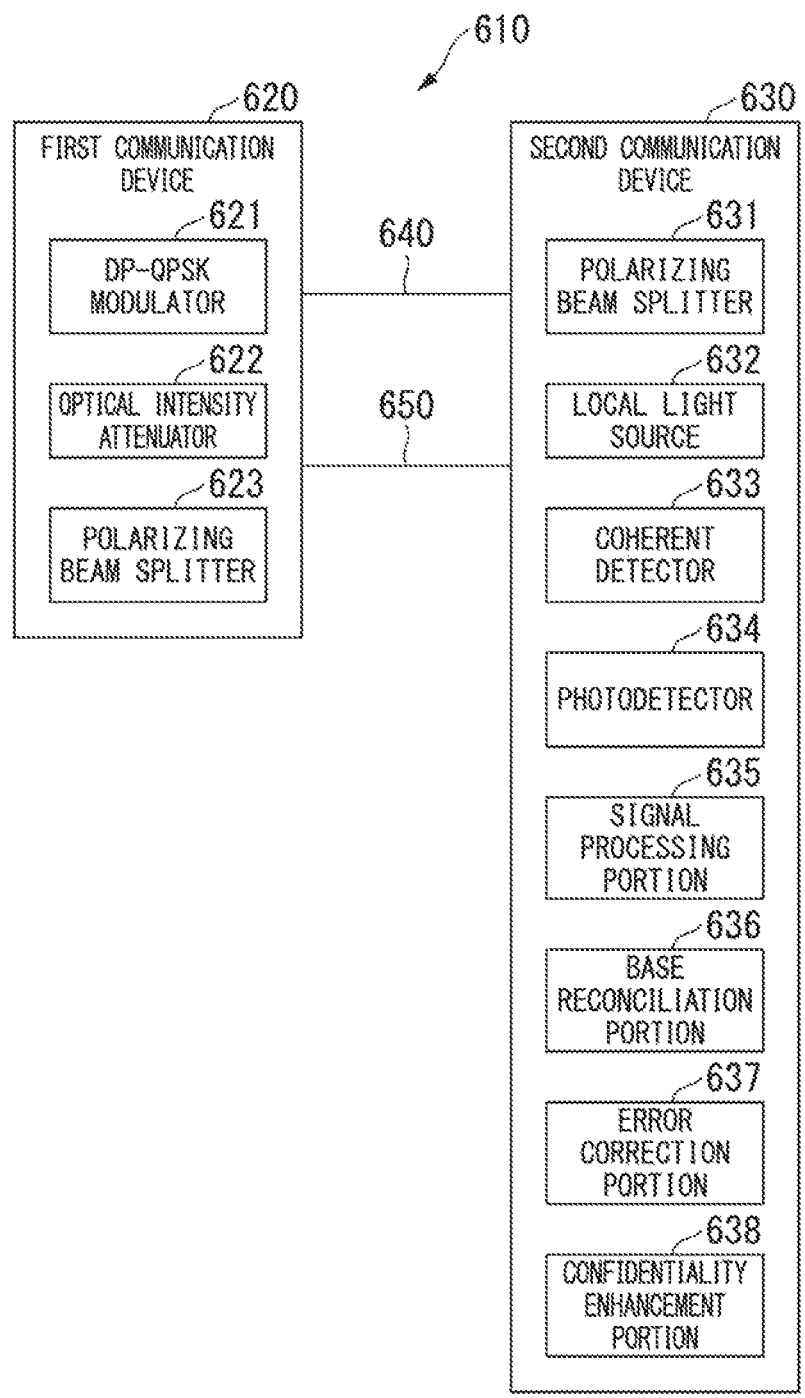
FIG. 5 is a diagram showing another example of the configuration of a quantum key delivery system according to the example embodiment.

FIG. 5 is a diagram showing another example of the configuration of a quantum key delivery system according to the example embodiment. In the configuration shown in FIG. 5, the quantum key delivery system 610 is provided with a first channel 640, and a first communication device 620 and a second communication device 630 communicatively connected by a second channel 650 that is more reliable than the first channel 640.

The first communication device 620 is provided with a DP-QPSK modulator 621, an optical intensity attenuator 622, and a polarizing beam splitter 623. The second communication device 630 is provided with a polarizing beam splitter 631, a local light source 632, a coherent detector 633, a photodetector 634, a signal processing portion 635, a base reconciliation portion 636, an error correction portion 637, and a confidentiality enhancement portion 638.

In such a configuration, the DP-QPSK modulator 621 phase modulates the first polarization component of the two orthogonal polarization components in the transmitted light based on the first random number sequence indicating the bit sequence to be transmitted and the second random number sequence indicating the base in the phase modulation of the bit sequence to be transmitted, and modulates the second polarization component, which is the other polarization component, into a signal representing the second random number sequence.

The optical intensity attenuator 622 attenuates the optical intensity of the modulated first polarization component.

The polarizing beam splitter 623 polarization multiplexes the first polarization component with attenuated light intensity and the modulated second polarization component, and outputs the resulting signal light to the first channel.

The polarizing beam splitter 631 polarizes and separates the transmitted signal light to read out the second random number sequence encoded in components orthogonal to the weak light and to extract the clock timing for weak light reception.

The local light source 632 outputs light for coherent detection.

The coherent detector 633 interferes with the weak light component of the polarization-separated components and the local light to read out the orthogonal phase component.

The photodetector 634 converts the readout orthogonal phase component into an electrical signal.

The signal processing portion 635 reads the first random number sequence from the electrical signal and generates a quantum raw key based on the clock timing extracted by the polarizing beam splitter 631.

The base reconciliation portion 636, based on the generated quantum raw key and the second random number sequence, generates a selection key by performing base reconciliation processing using communication on the second channel between the first communication device and the second communication device.

The error correction portion 637 performs error correction on the generated selection key using communication on the second channel between the first and second communication devices.

The confidentiality enhancement portion 638 generates a quantum key by performing confidentiality enhancement on the error-corrected selection key using communication on the second channel between the first and second communication devices.

The signal processing portion 635 is an example of a signal processing means. The base reconciliation portion 636 is an example of a base reconciliation means. The error correction portion 637 is an example of an error correction means. The confidentiality enhancement portion 638 is an example of a confidentiality enhancement means.

Thus, the first communication device 620 polarization-multiplexes the base selection information onto the quantum light, and the second communication device 630 uses this base selection information as a signal for clock extraction.

According to the quantum key delivery system 610, in this respect, the communication of signals for clock extraction to synchronize the clock timing between the transmission side and reception side of quantum light in continuous-variable quantum key delivery can be performed relatively efficiently. The quantum key delivery system 610 also improves the signal quality in that the second communication device 630 can obtain a signal for clock extraction with a stronger intensity than the quantum light.

In addition, in the quantum key delivery system 610, the quantum light and the base selection information used as the signal for clock extraction are polarization multiplexed and transmitted simultaneously, which reduces the effect of wavelength dispersion on the transmission path and thus improves the signal quality in this respect as well.

Figure 6:
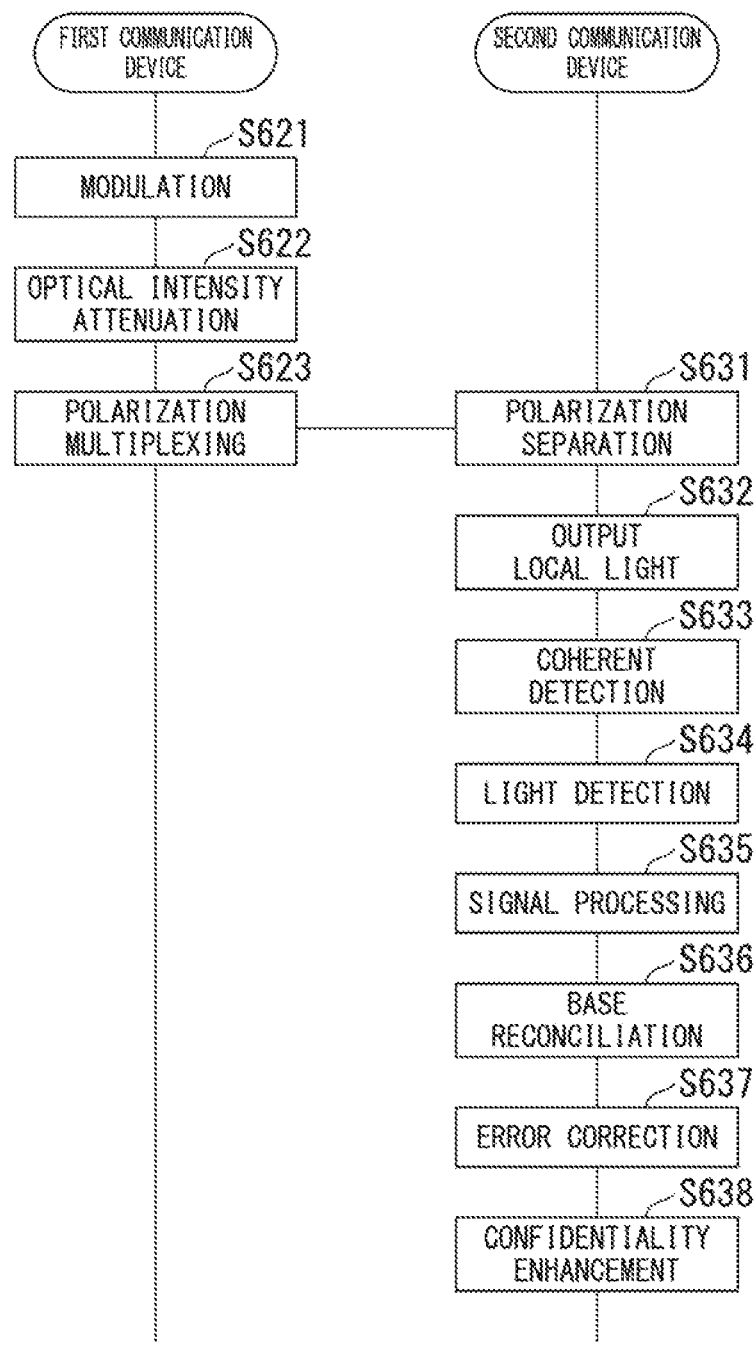
FIG. 6 is a diagram showing an example of the processing steps in the quantum key delivery method according to the example embodiment.

FIG. 6 is a diagram showing an example of the processing steps in the quantum key delivery method according to the example embodiment. The quantum key delivery method shown in FIG. 6 consists of performing modulation (Step S621), attenuating optical intensity (Step S622), polarization multiplexing (Step S623), polarization separation (Step S631), outputting local light (Step S632), coherent detection (Step S633), light detection (Step S634), signal processing (Step S635), base reconciliation (Step S636), error correction (Step S637), and confidentiality enhancement (Step S638).

In performing modulation (Step S621), the first communication device of a quantum key delivery system, which is provided with a first communication device and a second communication device which are connected to each other by a first channel and a second channel that is more reliable than the first channel, phase modulates the first polarization component of the two orthogonal polarization components in the transmitted light based on the first random number sequence indicating the bit sequence to be transmitted and the second random number sequence indicating the base in the phase modulation of the bit sequence to be transmitted, and modulates the second polarization component, which is the other polarization component, into a signal representing the second random number sequence.

In attenuating the optical intensity (Step S622), the first communication device attenuates the optical intensity of the modulated first polarization component.

In performing polarization multiplexing (Step S623), the first communication device attenuates the optical intensity of the modulated first polarization component.

In performing polarization separation (Step S631), the second communication device polarizes and separates the transmitted signal light to read out the second random number sequence encoded in components orthogonal to the weak light and to extract the clock timing for weak light reception.

In outputting local light (Step S632), the second communication device outputs local light for coherent detection.

In performing coherent detection (Step S633), the second communication device interferes with the weak light component of the polarization-separated components and the local light to read out the orthogonal phase component.

In detecting light (Step S634), the second communication device converts the readout orthogonal phase component into an electrical signal.

In signal processing (Step S635), the second communication device reads the first random number sequence from the electrical signal and generates a quantum raw key based on the extracted clock timing.

In performing base reconciliation (Step S636), the second communication device, based on the generated quantum raw key and the second random number sequence, generates a selection key by performing base reconciliation processing using communication on the second channel between the first communication device and the second communication device.

In performing error correction (Step S637), the second communication device performs error correction on the generated selection key using communication on the second channel between the first and second communication devices.

In performing confidentiality enhancement (Step S638), the second communication device generates a quantum key by performing confidentiality enhancement on the error-corrected selection key using communication on the second channel between the first and second communication devices.

Thus, the first communication device polarization-multiplexes the base selection information onto the quantum light, and the second communication device uses this base selection information as a signal for clock extraction. According to the quantum key delivery method shown in FIG. 6, in this respect, the communication of signals for clock extraction to synchronize the clock timing between the transmission side and reception side of quantum light in continuous-variable quantum key delivery can be performed relatively efficiently. The quantum key delivery method shown in FIG. 6 can improve the signal quality in that the second communication device can obtain a signal for clock extraction with a stronger intensity than the quantum light.

In addition, in the quantum key delivery method shown in FIG. 6, the quantum light and the base selection information used as the signal for clock extraction are polarization multiplexed and transmitted simultaneously, which reduces the effect of wavelength dispersion on the transmission path and thus improves the signal quality in this respect as well.

Figure 7:
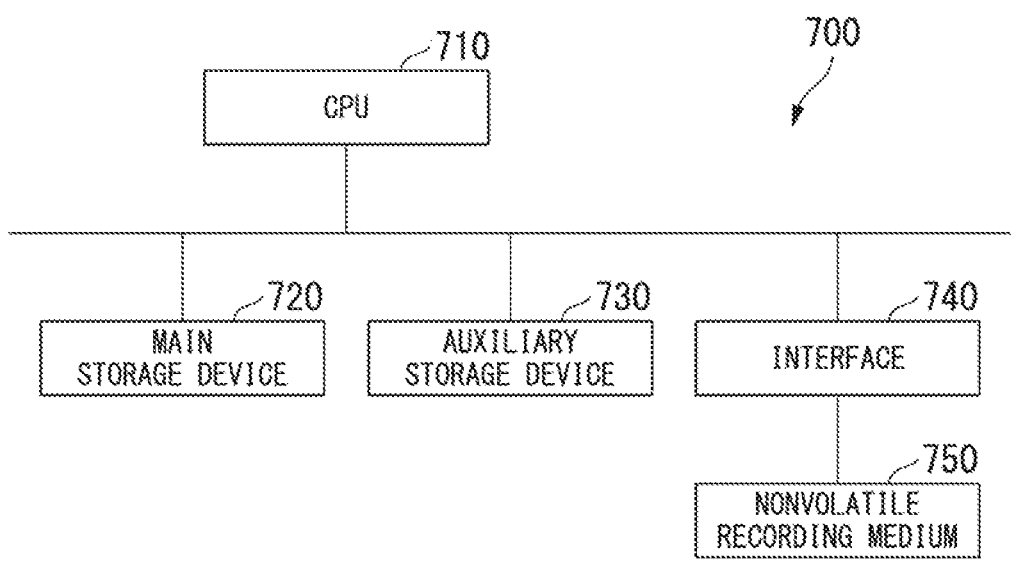
FIG. 7 is a schematic block diagram showing the configuration of a computer according to at least one example embodiment.

FIG. 7 is a schematic block diagram showing the configuration of a computer according to at least one example embodiment.

In the configuration shown in FIG. 7, a computer 700 is provided with a CPU 710, a main storage device 720, an auxiliary storage device 730, an interface 740, and a nonvolatile recording medium 750.

Any one or more of the above transmitter 10, receiver 20, first communication device 620, and second communication device 630, or any part thereof, may be controlled by the computer 700. In that case, the operation of these devices is stored in auxiliary storage device 730 in the form of a program. The CPU 710 reads the program from the auxiliary storage device 730, deploys it in the main storage device 720, and executes the aforementioned process according to the program. The CPU 710 also reserves storage space in the main storage device 720 for these devices to perform processing according to the program. Communication between each device and other devices may be performed by the interface 740 having a communication function and communicating according to the control of the CPU 710. Interaction between each device and the user may be performed by the interface 740, which is equipped with input/output devices such as a display, keyboard, and mouse, operating according to the control of the CPU 710. The interface 740 also has a port for the nonvolatile recording medium 750 and reads information from and writes information to the nonvolatile recording medium 750.

Any one or more of the above programs may be recorded on the nonvolatile recording medium 750. In this case, the interface 740 may read the program from the nonvolatile recording medium 750. The CPU 710 may then directly execute the program read by the interface 740, or it may be stored once in the main storage device 720 or auxiliary storage device 730 and then executed.

A program for executing all or part of the control over the transmitter 10, the receiver 20, the first communication device 620, and the second communication device 630 may be recorded on a computer-readable recording medium, and the program recorded on the recording medium may be read into the computer system and executed to perform the processing of each portion. The term "computer system" here shall include an operating system (OS) and hardware such as peripheral devices.

In addition, a "computer-readable recording medium" means a portable medium such as a flexible disk, magneto-optical disk, ROM (Read Only Memory), CD-ROM (Compact Disc Read Only Memory), or other storage device such as a hard disk built into a computer system. The aforementioned program may be used to realize some of the aforementioned functions, and may also be used to realize the aforementioned functions in combination with a program already recorded in the computer system.

While preferred example embodiments of the disclosure have been described and illustrated above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

While the disclosure has been particularly shown and described with reference to example embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A quantum key delivery system comprising:
   a first communication device and a second communication device communicatively connected by a first channel and a second channel that is more reliable than the first channel,
   the first communication device comprising:
   a dual-polarization quadrature phase-shift keying (DP-QPSK) modulator that phase modulates a first polarization component of two orthogonal polarization components in transmitted light and modulates a second polarization component, which is the other polarization component, into a signal indicating a second random number sequence based on a first random number sequence indicating the bit sequence to be transmitted and the second random number sequence indicating the base in the phase modulation of the bit sequence to be transmitted;
   an optical intensity attenuator that attenuates an optical intensity of the modulated first polarization component; and
   a polarizing beam splitter that polarization multiplexes the first polarization component with the attenuated optical intensity and the modulated second polarization component and outputs the resulting signal light to the first channel,
   and the second communication device comprising:
   a polarizing beam splitter that separates orthogonal polarization modes in the transmitted signal light to perform reading of the second random number sequence encoded in a component orthogonal to the weak light and extraction of the clock timing for the reception of the weak light;

a local light source for coherent detection;

a 90° hybrid that interferes with the weak light component among the polarization-separated components and the local light to read the orthogonal phase component;

a photodetector that converts the read orthogonal phase component into an electrical signal;

at least one memory configured to store instructions; and at least one processor configured to execute the instructions to:

generate a quantum raw key by reading the first random number sequence from the electrical signal based on the clock timing extracted by the polarizing beam splitter;

generate a selection key by performing a base reconciliation process using communication on the second channel between the first and second communication devices based on the generated quantum raw key and the second random number sequence;

perform error correction on the generated selection key, using communication on the second channel between the first and second communication devices; and generate a quantum key by enhancing the confidentiality of the selection key after error correction using communication in the second channel between the first and second communication devices.

2. The quantum key delivery system according to claim 1, wherein the first communication device comprises a delay unit that delays the signal light indicating the second random number sequence, and the DP-QPSK modulator modulates the delayed signal light with DP-QPSK.

3. A quantum key delivery method of controlling a first communication device and a second communication device of a quantum key delivery system comprising the first communication device and a second communication device communicatively connected by a first channel and a second channel that is more reliable than the first channel, the method of controlling the first communication device comprising:

phase modulating a first polarization component of two orthogonal polarization components in transmitted light and modulating a second polarization component, which is the other polarization component, into a signal indicating the second random number sequence, based on a first random number sequence indicating the bit sequence to be transmitted and the second random number sequence indicating the base in the phase modulation of the bit sequence to be transmitted;

attenuating an optical intensity of the modulated first polarization component; and polarization multiplexing the first polarization component with the attenuated optical intensity and the modulated second polarization component, and outputting the resulting signal light to the first channel, and the method of controlling the second communication device comprising:

separating orthogonal polarization modes in the transmitted signal light to perform reading of the second random number sequence encoded in a component orthogonal to the weak light and extraction of the clock timing for the reception of the weak light;

outputting local light for coherent detection;

interfering with the weak light component among the polarization-separated components and the local light to read the orthogonal phase component;

converting the read orthogonal phase component into an electrical signal;

generating a quantum raw key by reading the first random number sequence from the electrical signal based on the extracted clock timing;

generating a selection key by performing a base reconciliation process using communication on the second channel between the first and second communication devices based on the generated quantum raw key and the second random number sequence;

performing error correction on the generated selection key, using communication on the second channel between the first and second communication devices; and generating a quantum key by enhancing the confidentiality of the selection key after error correction using communication in the second channel between the first and second communication devices.

4. A non-transitory computer-readable storage medium storing a program for causing a computer that controls a first communication device and a second communication device of a quantum key delivery system comprising the first communication device and a second communication device communicatively connected by a first channel and a second channel that is more reliable than the first channel, for causing a computer that controls the first communication device:

to phase modulate a first polarization component of two orthogonal polarization components in transmitted light and modulate a second polarization component, which is the other polarization component, into a signal indicating the second random number sequence, based on a first random number sequence indicating the bit sequence to be transmitted and the second random number sequence indicating the base in the phase modulation of the bit sequence to be transmitted;

to attenuate an optical intensity of the modulated first polarization component; and to polarization multiplex the first polarization component with the attenuated optical intensity and the modulated second polarization component, and output the resulting signal light to the first channel, and for causing a computer that controls the second communication device:

to separate orthogonal polarization modes in the transmitted signal light to perform reading of the second random number sequence encoded in a component orthogonal to the weak light and extraction of the clock timing for the reception of the weak light;

to output local light for coherent detection;

to interfere with the weak light component among the polarization-separated components and the local light to read the orthogonal phase component;

to convert the read orthogonal phase component into an electrical signal;

to generate a quantum raw key by reading the first random number sequence from the electrical signal based on the extracted clock timing;

to generate a selection key by performing a base reconciliation process using communication on the second channel between the first and second communication devices based on the generated quantum raw key and the second random number sequence;

to perform error correction on the generated selection key, using communication on the second channel between the first and second communication devices; and to generate a quantum key by enhancing the confidentiality of the selection key after error correction using communication in the second channel between the first and second communication devices.

* * * * *